US012588109B2

(12) United States Patent
Martinez et al.

(10) Patent No.: US 12,588,109 B2
(45) Date of Patent: Mar. 24, 2026

(54) FLEXIBLE HIGH-POWER ELECTRONICS BUS

(71) Applicant: Liquid Wire Inc., Portland, OR (US)

(72) Inventors: Jesse Michael Martinez, Milwaukie, OR (US); Michael Adventure Hopkins, Portland, OR (US)

(73) Assignee: Liquid Wire Inc., Portland, OR (US)

( * ) Notice: Subject to any disclaimer, the term of this patent is extended or adjusted under 35 U.S.C. 154(b) by 0 days.

(21) Appl. No.: 18/558,589

(22) PCT Filed: May 17, 2022

(86) PCT No.: PCT/US2022/072371
§ 371 (c)(1),
(2) Date: Nov. 2, 2023

(87) PCT Pub. No.: WO2022/246402
PCT Pub. Date: Nov. 24, 2022

(65) Prior Publication Data
US 2024/0147582 A1 May 2, 2024

Related U.S. Application Data

(60) Provisional application No. 63/201,915, filed on May 18, 2021, provisional application No. 63/201,902, filed on May 18, 2021.

(51) Int. Cl.
*H05B 3/34* (2006.01)
*H05B 3/00* (2006.01)

(52) U.S. Cl.
CPC ........ *H05B 3/347* (2013.01); *H05B 2203/011* (2013.01)

(58) Field of Classification Search
CPC .............. H05B 3/347; H05B 2203/011; H05B 3/0004; H05B 3/0019
(Continued)

(56) References Cited

U.S. PATENT DOCUMENTS 3,425,020 A * 1/1969 Nishida .................... D03D 1/00 219/545
10,201,935 B2 * 2/2019 Augustine .............. B23K 13/00
(Continued)

FOREIGN PATENT DOCUMENTS

JP S4616231 Y1 6/1971
JP 2015221138 A 12/2015
(Continued)

OTHER PUBLICATIONS

"International Application Serial No. PCT/US2022/072371, International Search Report mailed Sep. 21, 2022", 6 pgs.
(Continued)

*Primary Examiner* — Eric S Stapleton
(74) *Attorney, Agent, or Firm* — Quinn IP Law

(57) ABSTRACT

Devices, systems, and methods include a conductive textile (106) comprising a plurality of conductive strands and a flexible bus (102). The flexible bus (102) includes a conductive gel (104) electrically coupled to the conductive strands and an encapsulant (108) bonded to the conductive textile (106) and configured to contain the conductive gel (104) in contact with the conductive strands. The flexible bus is configured to be electrically coupled to a power source and induce a current from the power source to the conductive strands.

17 Claims, 8 Drawing Sheets

(58) Field of Classification Search
USPC .......................................................... 219/545
See application file for complete search history.

(56) References Cited

U.S. PATENT DOCUMENTS

| | | | | |
|---|---|---|---|---|
| 11,088,063 | B2 * | 8/2021 | Ronay | H05K 3/305 |
| 2008/0083721 | A1 * | 4/2008 | Kaiserman | H05B 3/342 219/211 |
| 2008/0230530 | A1 * | 9/2008 | Augustine | H05B 3/347 219/548 |
| 2011/0226751 | A1 | 9/2011 | Lazanja et al. | |
| 2014/0263265 | A1 * | 9/2014 | Augustine | H05B 3/34 219/212 |
| 2015/0366367 | A1 * | 12/2015 | Augustine | H05B 3/146 219/217 |
| 2015/0373781 | A1 * | 12/2015 | Augustine | B23K 20/22 219/217 |
| 2016/0143091 | A1 * | 5/2016 | Augustine | A61B 18/16 219/528 |
| 2020/0066628 | A1 * | 2/2020 | Ronay | H01L 23/49838 |
| 2020/0381349 | A1 * | 12/2020 | Ronay | H01L 23/49822 |

FOREIGN PATENT DOCUMENTS

| | | | |
|---|---|---|---|
| WO | 2019124566 | A1 | 6/2019 |
| WO | WO-2022246402 | A1 | 11/2022 |

OTHER PUBLICATIONS

"International Application Serial No. PCT/US2022/072371, Written Opinion mailed Sep. 21, 2022", 6 pgs.

* cited by examiner

FLEXIBLE HIGH-POWER ELECTRONICS BUS

CLAIM OF PRIORITY

This patent application is a U.S. National Stage Filing under 35 U.S.C. 371 from International Application No. PCT/US2022/072371, filed May 17, 2022, and published as WO 2022/246402, which claims the benefit of priority to U.S. Provisional Patent Application Ser. Nos. 63/201,902, filed May 18, 2021 and 63/201,915, filed May 18, 2021, each of which are incorporated by reference herein in their entirety.

International Application No. PCT/US2022/072371 also claims the benefit of priority to U.S. Provisional Patent Application Ser. Nos. 63/201,902, filed May 18, 2021 and 63/201,915, filed May 18, 2021, each of which are incorporated by reference herein in their entirety.

BACKGROUND

Flexible electronic circuits may be utilized in a variety of situations in which an article with such electronics may be expected to be flexed or bent routinely as part of use of the article, such as in apparel and wearable articles as well as other consumer and industrial applications. To the extent that electronics are manufactured to be flexible as would be understood by a typical user, such flexibility is typically constrained by multiple factors. Among such constraints is thickness or size in general. Because conventional wires and circuit boards are made of materials such as copper, silver and the like, to become flexible or routinely bendable along multiple axes those components are often thin in comparison with otherwise similar components utilized in otherwise similar ways.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Example methods and systems are directed to a flexible high-power electronic bus, system, and method. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A conventional consequence of making an electronic circuit flexible is that such components can operate within relatively low power environments. Because such circuits are of necessity relatively thin, only relatively little current and voltage can be allowed to pass through or be put over components of such circuits. Consequently, flexible electronics that may often be utilized in consumer electronics, automotive, or other similar applications may be limited to the range of two to three Watts or less.

A flexible electronic bus has been developed that is capable of higher power than prior flexible circuits. In various examples, the flexible bus is capable of power throughput of tens of Watts or more. In various examples, the flexible bus incorporates a liquid or gel conductor that provides both for flexibility as well as high power throughput. The flexible bus may be utilized in any of a variety of circumstances, including in wearable articles, consumer electronics, medical patches and other medical devices, mobility applications, and the like. For the purposes of this disclosure, the flexible bus will be described in relation to a thermal blanket which provides localized heating. In such a circumstance, the flexible bus may be flexed, bent, or otherwise manipulated repetitively, variably, and in multiple axes while providing tens of Watts of power, e.g., thirty (30) Watts, in order to function in a useful way. Consequently, the use in the context of or as a thermal blanket presents an apt illustration of a use of the high-power flexible bus. However, it is to be recognized and understood that the flexible bus may be incorporated into any suitable system or article.

Moreover, the flexible bus may be applied to any of a variety of non-discrete electrical components, including an electrical component without defined terminal contacts. For instance, a mesh fabric that lacks terminal contacts may nonetheless be implemented as a space heater or thermoelectric energy harvester through the incorporation of conductive gel placed in electrical contact with the mesh. The conductive gel and flexible bus generally may either provide terminals for such a non-discrete electrical component or may otherwise facilitate current flow to or from the non-discrete electrical component.

Figure 1:
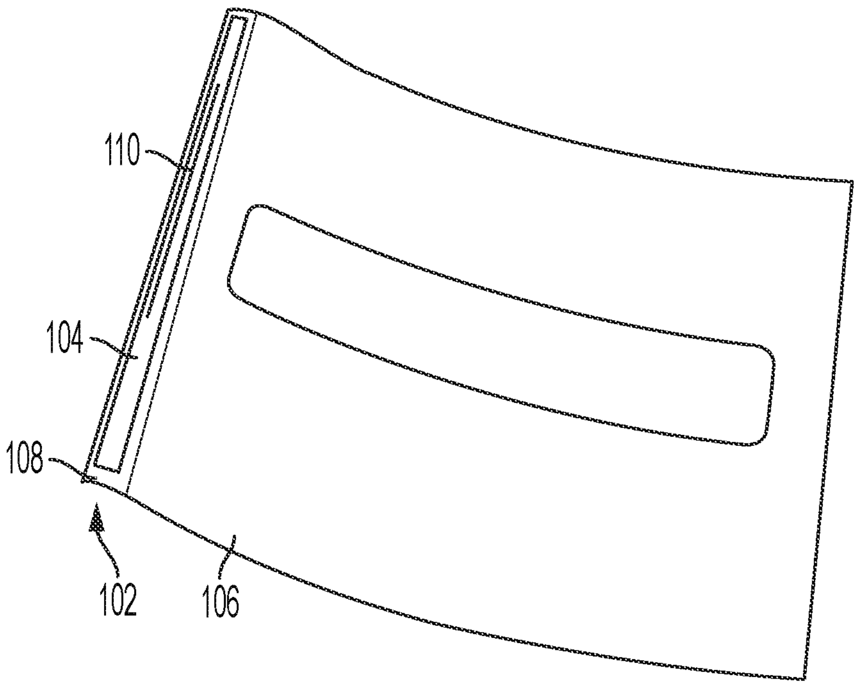
FIG. 1 is a flexible bus, in an example embodiment.

FIG. 1 is a flexible bus 102, in an example embodiment. The flexible bus 102 includes conductive gel 104 incorporated onto or into substrate, such as a conductive textile 106. The flexible bus 102 may be incorporated into the conductive textile 106 through any suitable process, such as heat press bonding or any process that may wet the conductive gel 104 to the conductive textile 106. Consequently, the flexible bus 102 provides for power to flow along the conductive gel 104 to energize and flow over the conductive textile 106. An encapsulant 108, such as thermoplastic polyurethane (TPU) is applied with or over the conductive gel 104. In various examples, the encapsulant 108 flows into voids of the conductive textile 106. In various further examples, the encapsulant 108 forms a channel into which the conductive gel 104 may be contained and which may help guide the flow conductive gel 104 into the appropriate discrete locations on the conductive textile 106 bounded by the encapsulant 108.

In various examples, the conductive textile 106 may include an interwoven pattern of conductive strands, e.g., stainless steel or other suitable conductor and non-conductive or insulative fibers, filaments, or threads, e.g., nylon or other suitable non-conductive material. In various further examples, the conductive strands may be a non-conductive material with a conductive overlay material, such as graphene fibers doped with a conductor. In general, the conductive strands may be formed of any suitable material that does not tend to become brittle over normal product use timeframes and may stand in contrast to various conductive epoxies that may become brittle over relatively short timeframes. While strands are generally disclosed herein, it is to be recognized and understood that alternative materials may be utilized, including but not limited to fibers, filaments, threads and yarns, and that strands are utilized herein as a general term that does not exclude fibers, filaments, threads yarns, or other suitable materials. The conductive textile 106 may be formed by interlacing or distributing conductive strands using any number of construction methods including, by way of example, knitting, weaving, bonding, felting, or other know textile production techniques. Optionally, the conductive strands may be combined with insulating or non-conductive fibers as contemplated above.

In a woven example, a pattern of non-conductive and conductive strands may be generally parallel to one another and perpendicular or orthogonal to the non-conductive strands. The conductive strands may be electrically coupled with the flexible bus 102 and, in one embodiment, generally perpendicular or orthogonal to a line 110 defined by the flexible bus 102 if a linear bus is desired. In other examples not shown, a flexible bus may have a curved, angled, or irregular shape and form any desired angle in relation to the conductive strands at any point along the length of the flexible bus. Consequently, current induced over the flexible bus 102 may tend to propagate down the conductive strands along a length of the conductive strands, propagating through the conductive textile 106 away from the flexible bus 102.

In various examples, the conductive textile 106 may have at least one layers of conductive strands separated from one another by a layer of non-conductive strands. In such an example, a top layer of conductive strands and a bottom layer of conductive strands are separated by a layer of non-conductive strands. In such examples, the conductive gel 104 may be dispersed through an entire thickness of the conductive textile 106 in order to make electrical contact with both layers of conductive strands. In another example, the conductive textile 106 includes a single layer of conductive strands and a single layer of non-conductive strands. In various such examples, the conductive and at least some of the non-conductive strands may alternate in relative position, for example, when provided with a woven structure.

Figure 2:
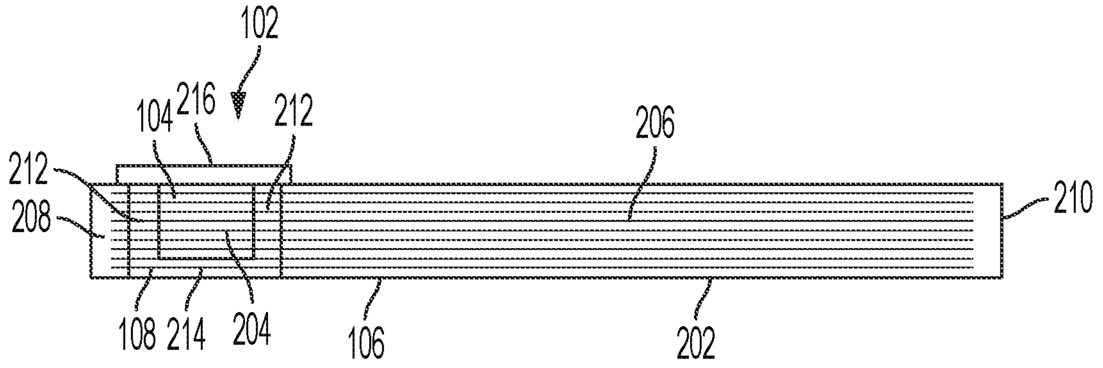
FIG. 2 is a simplified side view of the flexible bus in relation to a conductive textile, in an example embodiment.

FIG. 2 is a simplified side view of the flexible bus 102 in relation to the conductive textile 106, in an example embodiment. In the example embodiment, the conductive textile 106 is comprised of a layer 202, an encapsulant 108 forming a channel 204, and conductive gel 104 within the channel 204 formed by the encapsulant 108. The layer 202 is comprised of conductive strands 206 extending generally from a first end 208 to a second end 210 of the layer 202. The conductive strands 206 are presented in a parallel arrangement for the purposes of simplified illustration and it is to be recognized and understood that the conductive strands 206 may be arranged in any arrangement of strands in a piece of fabric, though generally proceeding from the first end 208 to the second end 210. The layer 202 may optionally further include a weave pattern of non-conductive strands with the conductive strands 206. The non-conductive strands may be generally orthogonal to the conductive strands 206 and are omitted from this example for the purposes of clarity.

The encapsulant 108 forms the channel 204 by way of at least two walls 212 and a floor 214. The walls 212 generally oppose one another and extend generally perpendicular to the strands 206. The floor 214 extends generally parallel to the strands 206. Consequently, the channel 204 may be understood to have a width extending between the walls 212 a depth extending from the floor 214 to a top of the conductive textile 106. At least some of the strands 206 extend from the channel 204, where the strands 206 are in electrical contact with the conductive gel 104, through and beyond one or both of the walls 212 of the encapsulant 108. As illustrated in FIG. 1, the channel 204 specifically and the encapsulant 108 generally has a length generally extending along the conductive textile 106. In an example, the width of the channel 204 is approximately three (3) millimeters and the depth is approximately one hundred (100) microns.

While the encapsulant 108 is shown here with straight lines it is to be recognized and understood that as implemented the encapsulant 108 may not tend to have straight lines and clear delineations between, e.g., the walls 212 and the floor 214. Consequently, it is to be recognized and understood that a wall 212 may be any portion of the encapsulant 108 that tends to inhibit movement of the conductive gel 104 out of the channel 204 laterally along the strands 206 and the conductive textile 106 generally, while the floor 214 may be any portion of the encapsulant 108 that tends to inhibit movement of the conductive gel 104 out of the channel 204 out of the conductive textile 106.

As illustrated, the conductive gel 104 is dispersed over the conductive strands 206, electrically coupling the conductive strands 206 with respect to one another and with respect to the conductive gel 104. Consequently, a current flowing over the conductive gel 104 may flow to and over the conductive strands 206. An optional external conductor 216 is electrically coupled to the conductive gel 104. In such an example, the conductor is described as external since a portion of the conductor may be external to, or not in direct contact with, the conductive gel 104. The external conductor 216 may be copper, gold, silver, or any suitable conductor which may allow for increased current flow over the flexible bus 102 relative to what may be provided by the conductive gel 104 alone. In such an example, current may flow over the external conductor 216 to the conductive gel 104 and then to the conductive strands 206. In some or all such examples, the external conductor 216 may have a thickness that is much smaller than a width of the external conductor 216, and may further have a width much smaller than a length of the external conductor 216, for example, in a strip of conductive foil. As such, the contact area between the conductive gel 104 and the external conductor 216 may be substantially maximized. In other examples, an external conductor 216 may be provided generally within or encased by a conductive gel, such as the conductive gel 104, such that the external conductor 216 is completely of partially surrounded by conductive gel 104, and may have a width to thickness ratio approaching or equal to 1:1 (including, e.g., circular, square, rectangular, triangular, trapezoidal, or similar cross sectional geometries), such that the external conductor 216 is arranged coaxially with the conductive gel 104. Optionally, an encapsulant 108 may comprise the exterior-most surface of the flexible bus so as to contain the conductive gel 104 and prevent migration and dilution of the conductive gel 104 within the conductive textile 106. In an example, the external conductor 216 has a width of approximately ten (10) millimeters and a thickness from two (2) to three (3) millimeters, in an example 2.6 millimeters.

Figure 3:
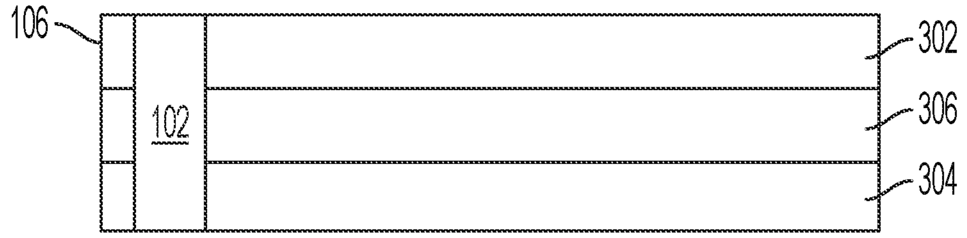
FIG. 3 is a simplified side view of the flexible bus in relation to layers of the conductive textile, in an example embodiment.

FIG. 3 is a simplified side view of the flexible bus 102 in relation to layers of the conductive textile 106, in an example embodiment. The layers include a first conductive layer 302 and a second conductive layer 304, and a non-conductive layer 306 positioned between and adjacent to the first conductive layer 302 and the second conductive layer 304. The non-conductive layer 306 electrically isolates the first conductive layer 302 from the second conductive layer 304. The conductive gel 104 and encapsulant 108 of the flexible bus 102 is flowed through, wetted, or adhered to or otherwise saturating the layers 302, 304, 306. The conductive gel 104 is therefore in electrical contact with the first conductive layer 302 and the second conductive layer 304, and the encapsulant 108 may surround at least a portion of the conductive gel 104, thereby containing the conductive gel 104 to discrete locations of the textile 106. In various examples, additional encapsulant 108 may cover one or both sides of the flexible bus 102.

As previously contemplated, the encapsulant 108 may, optionally, completely surround our bound the flexible bus 102 to contain the conductive gel 104. Thereby, the encapsulant 108 may further prevent lateral (or end) dispersion or leaking of the conductive gel 104 into the conductive textile 106 or out of the flexible bus 102 entirely. In an example, if the encapsulant 108 is a thermoplastic film, and optionally the conductive textile 106 includes non-conductive layer 306 comprised of thermoplastic fibers adjacent the flexible bus 102, a linear heat pressing operation may be performed to the encapsulant 108 and the conductive textile 106 such that material surrounding the flexible bus 102 generally seals off a "pocket" of the conductive gel 104, limiting dispersion to thermoplastic fibers within the pocket. Similarly the encapsulant 108 in a fluid state may be cast over (e.g. in the case of a thermosetting resin) or applied under pressure (e.g., co-molded) over the conductive gel 104 around the flexible bus 102, and dispersing the encapsulant 108 amongst the fibers of the conductive textile 106 to prevent migration of the conductive 104 gel beyond an envelope defined by the encapsulant 108. Encapsulant 108 may be applied in a first step on either side of the flexible bus 102 to define a barrier, similar to that described above, and allowed to cure or solidify, and then encapsulant 108 may later be applied over the flexible bus 102 and barrier(s).

It is emphasized that FIG. 3 is a simplified representation that generally provides an embodiment of positional relationships between the various components and that precise details of the relationship between and among the various components should not necessarily be inferred. For instance, the flexible bus 102 may not necessarily flow evenly or completely through the layers 302, 304, 306. The individual layers 302, 304, 306 may be comprised of individual strands and would not necessarily provide clear spatial demarcation between the layers 302, 304, 306, and the strands in the conductive layers 302, 304 may be, e.g., of stainless steel or any other suitable conductive material. The individual strands, both conductive and non-conductive, may be woven, knit, or felted together, or non-woven textile manufacturing methods may be applied so as to produce the resulting conductive textile. Indeed, the strands of the first conductive layer 302 and the second conductive layer 304 may be, and in various examples are, woven, knit, felted, or otherwise comingled with strands of the non-conductive layer 306 to generally form the conductive textile 106. Consequently, the first conductive layer 302 and the second conductive layer 304 may be understood to comprise a first set of conductive strands and a second set of conductive strands, respectively, isolated with respect to one another by the at least one non-conductive layer 306.

As noted above, further examples of the conductive textile 106 incorporate only one conductive layer, e.g., the first conductive layer 302. In such examples, the first conductive layer 302 is positioned on or in relation to at least one non-conductive layer 306 or is effectively positioned between at least two non-conductive layers 306. Further, the pattern of conductive layers separated by a non-conductive layer may be repeated as desired to form a conductive textile 106 that has a desired number of conductive layers. In such an example, the flexible bus 102 may be flowed through and wetted to each of the conductive layers.

Further examples of the flexible bus 102 integrate the first conductive layer 302 and the at least one non-conductive layer 306 as a single or comingled physical layer. In such examples, the first conductive layer 302 and the non-conductive layer 306 may be electrically separate and distinct but physically combined. For instance, a single layer may include a conductive coating on non-conductive strands. Or the single layer may include thermoelectric fibers with no isolation layer. Such structures are provided by way of example and without limitations and any suitable technology that is known in the art or may be developed may be utilized in a single layer example.

Figure 4:
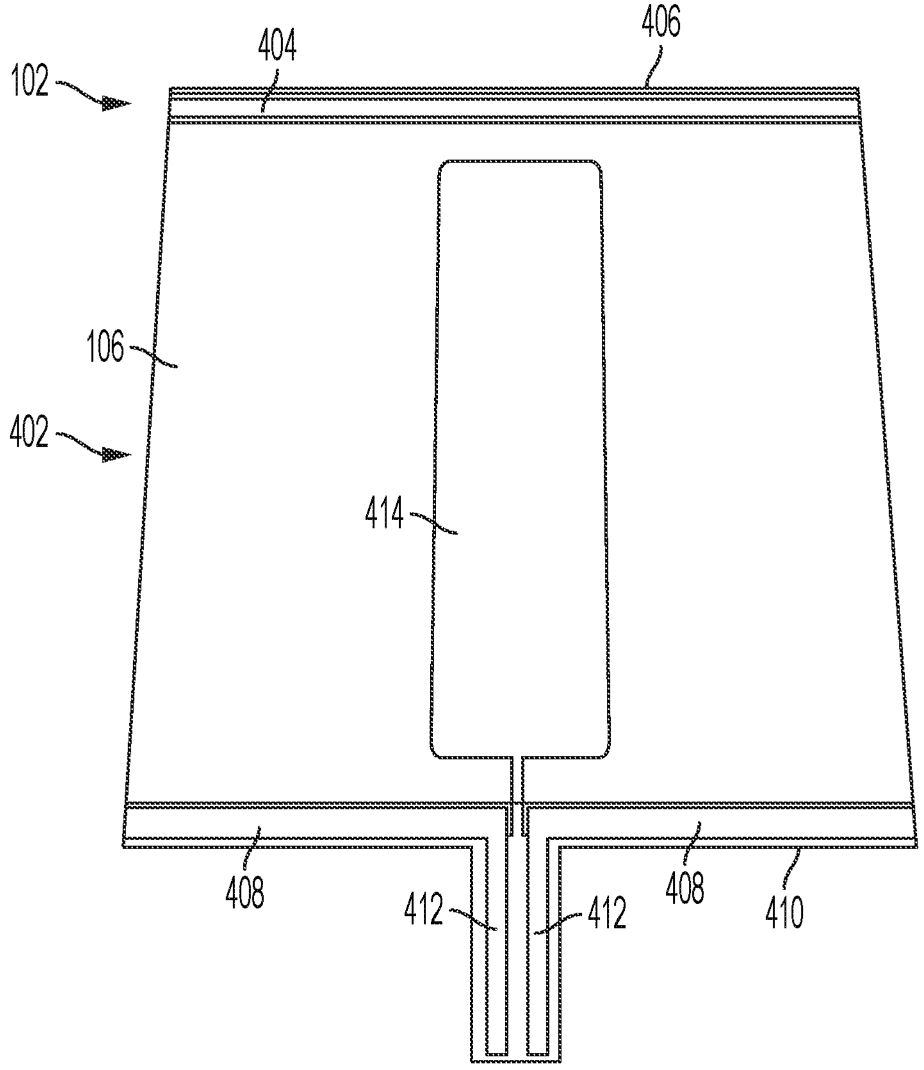
FIG. 4 is a thermal blanket incorporating the flexible bus, in an example embodiment.

FIG. 4 is a thermal blanket 402 incorporating the flexible bus 102, in an example embodiment. The thermal blanket 402 may be incorporated into any suitable system or apparatus in which a power source may supply suitable power to the flexible bus 102 for delivery over the conductive textile 106, the resultant heating of which may radiate from the thermal blanket 402 to the apparatus or system into which the thermal blanket 402 has been incorporated. Such apparatuses or systems include, by way of non-limiting example, apparel, such as a jacket or wetsuit, footwear, such as a boot upper or liner, a portion of furniture, such as a seating surface, a blanket, a cover, a shelter including tents, campers, and the like, as well as surfaces or structures that are desired to be kept warm or free of environmental conditions such as snow, sleet, or the like. Alternatively, the same or similar structures may be used to harvest heat from the environment or an adjacent body and convert the heat to electrical current, which may be used to charge a power supply.

The thermal blanket 402 includes the conductive textile 106 and the flexible bus 102, which in this view is obscured by an optional external conductor 216, such as anode 404, the flexible bus 102 and the anode 404 both positioned at or proximate, e.g., within several millimeters, of a first edge 406 of the conductive textile 106 and the thermal blanket 402 generally. The anode 404 may be electrically coupled to the flexible bus 102 and may promote coupling of an external power source with the flexible bus 102 and the flexible bus 102. As such, the anode 404 may be understood to be a component of the flexible bus 102 that may be incorporated as desired to promote electrical connectivity and power throughput. Cathodes 408 are optionally positioned at or proximate a second edge 410 of the conductive textile 106 relative to the flexible bus 102, causing current to flow over the conductive textile 106 from the flexible bus 102 to the cathodes 408. As implemented, the cathodes 408 are each coupled to or otherwise form leads 412 to promote coupling to ground or otherwise complete a circuit with an external power source supplying power to the flexible bus 102.

In the illustrated examples, a hole 414 is included in the conductive textile 106 to promote desired current flow and consequent heating patterns, and/or to tune the heat output density, e.g., Watts per unit area, of the entire thermal blanket 402, and/or input, depending on what the device is being used for, for example to generate or harvest heat. A hole 414 is also formed between to separate the individual cathodes 408 and leads 412. The holes 414 may be formed in the conductive textile 106 at manufacture or may be cut into the conductive textile 106 at any subsequent time to create desired patterns.

Owing to the nature of the conductive textile 106 and the first conductive layer 302 and the second conductive layer 304, the breaking of individual conductive strands 206 of a given layer 302, 304 would not necessarily render the thermal blanket 402 inoperative. In particular, because all or most of the conductive strands 206 of each layer 302, 304 may be expected to be electrically coupled to the flexible bus 102 and extending from the first edge 406 to the second edge 410, the severing of individual strands 206 would not necessarily impact the operation of other conductive strands 206 of a layer 302, 304. On the contrary, the thermal blanket 402 may be expected to remain operational even with the severing of multiple conductive strands 206. This may be contrast to thermal blankets known in the art, which, owing to the inclusion of far fewer individual conductors, including as few as one or two conductors, may be much more susceptible to becoming non-functional in the event of the severing of individual conductors.

Example dimensions of the various components of the thermal blanket 402 are provided here for illustrative purposes and not limitation, and it is to be recognized and understood that these dimensions may be scaled in proportion both for desired power throughput and overall size for the circumstances in which the thermal blanket 402 may be used. Moreover, components of the flexible bus 102 may be similarly changed in size for circumstances in which the flexible bus 102 is not incorporated into a thermal blanket 402. The example dimensions include the anode 404 being ten (10) millimeters wide and three hundred ten (414) millimeters long and each cathode 408 being ten (10) millimeters wide and one hundred fifty (150) millimeters long. The conductive textile 106 is three hundred thirty millimeters (330) long in the conductive direction generally defined between the anode 404 and the cathode 408 and three hundred ten (414) millimeters along the opposite, non-conductive direction.

Figure 5:
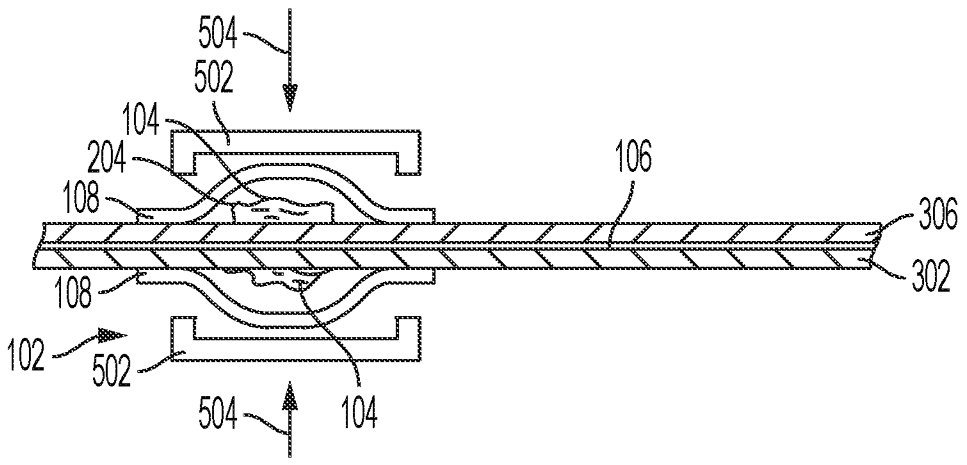
FIG. 5 is a depiction of an intermediate step in the making of the flexible bus on the conductive textile, in an example embodiment.

FIG. 5 is a depiction of an intermediate step in the making of the flexible bus 102 on the conductive textile 106, in an example embodiment. In the illustrated example, the conductive textile 106 includes a first conductive layer 302 and a non-conductive layer 306, though it is noted that the conductive textile 106 may incorporate any number of desired conductive and non-conductive layers, as disclosed herein. In the intermediate step as illustrated, conductive gel 104 has been placed or applied on both the first conductive layer 302 and the non-conductive layer 306. Encapsulant 108 has been placed or applied over each of the instances of the conductive gel 104.

As illustrated, in the intermediate step heating elements 502 have been placed over and/or around the encapsulants 108 and conductive gels 104. As the heating elements 502 are heated, thereby transferring heat to the encapsulants 108 and conductive gels 104, force 504 is placed on each of the heating elements 502 to further press on and pinch the encapsulants 108 to form the channel 204 therebetween, in which the conductive gel 104 is contained.

It should be appreciated that any shape or location of the channel 204, both in cross-section and in plan view, can be used to form a flexible bus 102 anywhere on the conductive textile 106. As such, the flexible bus 102 may be circular, a zig-zag, a curve, a sinusoidal or meandering path, and so forth. Moreover, the flexible bus 102 is not necessarily formed along the edge of the conductive textile 106 but rather may be formed in the middle of the conductive textile 106. In an example, a flexible bus 102 may surrounding each hole 414 (see FIG. 4) at a perimeter of the hole 414 instead of or in addition to a flexible bus 102 being placed along an edge of the conductive textile 106.

Figure 6:
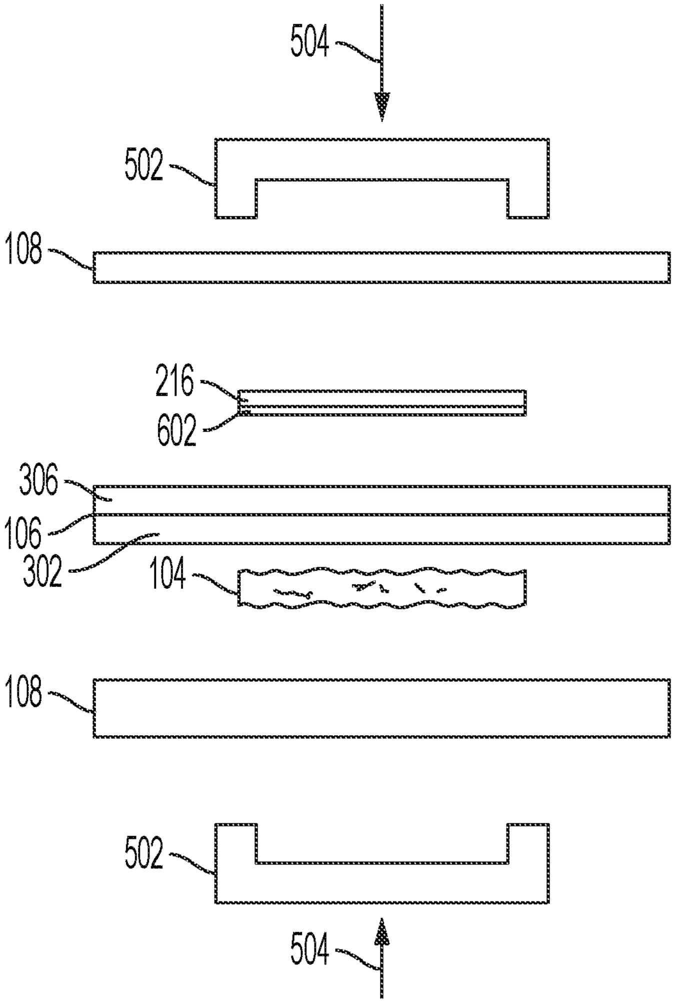
FIG. 6 is an exploded view of an intermediate step of a process for making a portion of the flexible bus, in an example embodiment.

FIG. 6 is an exploded view of an intermediate step of a process for making a portion of the flexible bus 102, in an example embodiment. The flexible bus 102 includes the conductive gel 104 and the encapsulant 108 positioned in relation to the first conductive layer 302 and non-conductive layer 306 of the conductive textile 106. The flexible bus 102 further includes the external conductor 216 secured to the conductive textile 106 with an adhesive 602, the external conductor 216 and adhesive 602 together forming an anode 404 (see FIG. 4). After application of heat and force 504 with the heating elements 502, the conductive gel 104 may disperse through the conductive textile 106 and electrically couple with and between the strands 206 (see FIG. 2) of the first conductive layer 302 and the external conductor 216. As illustrated, the conductive gel 104 may be deposited to an opposite side of the conductive textile 106 relative to the external conductor 216. Optionally, the conductive gel 104 can be slightly wider than the external conductor 216.

While the example of FIG. 6 would result in the external conductor 216 included under or otherwise encapsulated by the encapsulant 108 and within a resultant channel 204 (see FIG. 2), it is noted that various examples of the flexible bus 102 include the external conductor 216 wholly or substantially outside of the encapsulant 108. It is further noted that a portion of the external conductor 216 may be positioned outside of the encapsulant 108 in order to leads 412 (see FIG. 4). Consequently, the inclusion of the external conductor 216 under the encapsulant 108 is not limiting and is provided as an example of how at least a portion of the external conductor 216 may be encapsulated.

The adhesive 602 may be any suitable glue, epoxy, paste, film, etc., to secure the external conductor 216 to the conductive textile 106. As shown, the adhesive 602 is already applied to the external conductor 216 prior to placing the external conductor 216 in contact with the conductive textile 106. As such, the external conductor 216 as illustrated may be a copper tape or other related material or product. Alternatively, the adhesive 602 may be applied to the conductive textile 106 and the external conductor 216 then placed in contact with the adhesive 602 prior to heat and force 504 being applied by the heating element 502.

Figure 7:
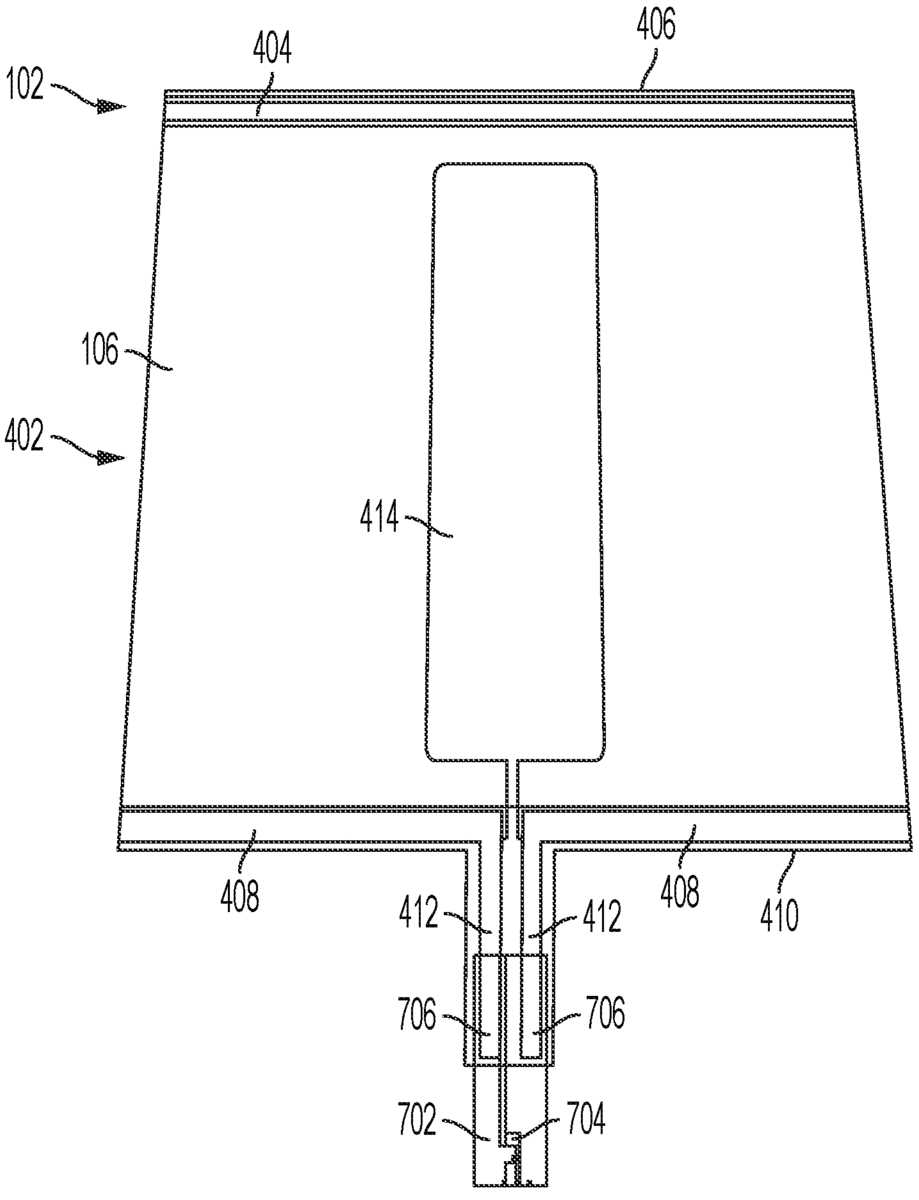
FIG. 7 is a system incorporating the thermal blanket coupled with a peripheral flexible board, in an example embodiment.

FIG. 7 is a system incorporating the thermal blanket 402 coupled with a peripheral flexible board 702, in an example embodiment. In various examples, the flexible board 702 is formed from a first substrate layer having a metal clad layer and a second substrate layer including a trace formed from the conductive gel 104, the first substrate layer bonded or otherwise attached to the second substrate layer. In various examples, the first substrate layer is formed from one of a thermoset epoxy-based film, TPU, and/or silicone, among other compounds or materials. In one example, the first substrate layer is a copper-clad epoxy-based film. The flexible board 702 may further couple with external components of a wider system, such as a power source, external processor, control circuitry, and the like. Details of the first and second substrate layers and various possible configurations thereof, are disclosed in U.S. Patent Application Publication No. 2020/0381349, "CONTINUOUS INTERCONNECTS BETWEEN HETEROGENEOUS MATERIALS", Ronay et al., incorporated by reference herein in its entirety.

The flexible board 702 includes one or more electronic components 704, such as a controller, power circuitry, surface mount components such as transistors, resistors, capacitors, and the like, or any other desired electronic components. The electronic components 704 may be soldered or otherwise secured to the metal clad layer of the first substrate layer. The flexible board 702 is electrically coupled to the thermal blanket 402 by way of electrodes 706 formed from the metal clad layer electrically coupled to the leads 412, e.g., by soldering or any other suitable mode of electrically coupling flexible electronics.

While the example of the flexible board 702 is illustrated here, it is to be recognized and understood that some or all of the electronic components 704 may be incorporated directly onto the thermal blanket 402 and the flexible board 702 may optionally be omitted. Additionally or alternatively, the electronic components 704 may be split between the thermal blanket 402 and the flexible board 702. In such examples, the electronic components 704 may be electrically coupled, e.g., soldered, to some of the electrically conductive strands 206, to the external conductor 216 or anode 404, and/or to the cathode 408.

FIGS. 9A and 9B are exploded and cutaway side profiles, respectively, of a flexible bus 802, in an example embodiment. In particular, the flexible bus 802 includes the conductive gel 104 and the external conductor 216 encapsulated by encapsulant 108. However, in contrast to the flexible bus 102, the flexible bus 802 does not include or is not implemented in relation to a fabric, conductive or otherwise, or other substance.

The encapsulant 108 may be variously be implemented as a flexible and/or stretchable film as disclosed herein. The external conductor 216 may be comprised of copper or other suitable conductor. As illustrated, the external conductor 216 is implemented as a thin sheet, but it is to be recognized and understood that any desired and/or suitable configuration for the external conductor 216 may be implemented as appropriate to the circumstances in which the flexible bus 802 is or is intended to be utilized. Moreover, in various examples the external conductor 216 may be implemented as a tape, with an adhesive surface configured to be adhered to the encapsulant 108 and/or the conductive gel 104.

Figure 8A:
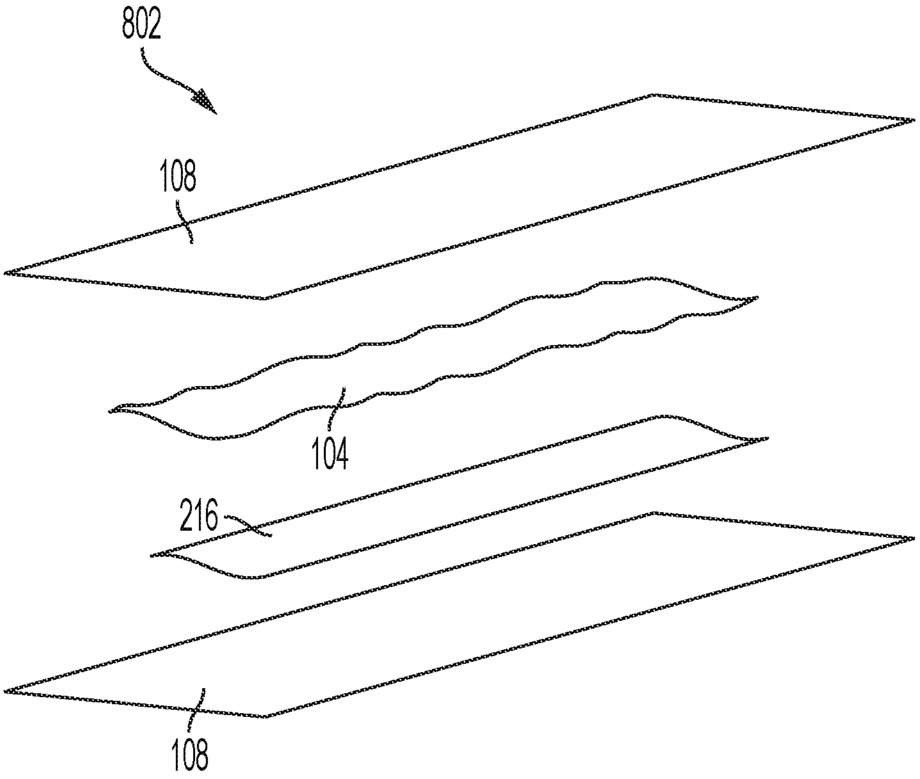
FIGS. 8A and 8B are exploded and cutaway side profiles, respectively, of a flexible bus, in an example embodiment.
Figure 8B:
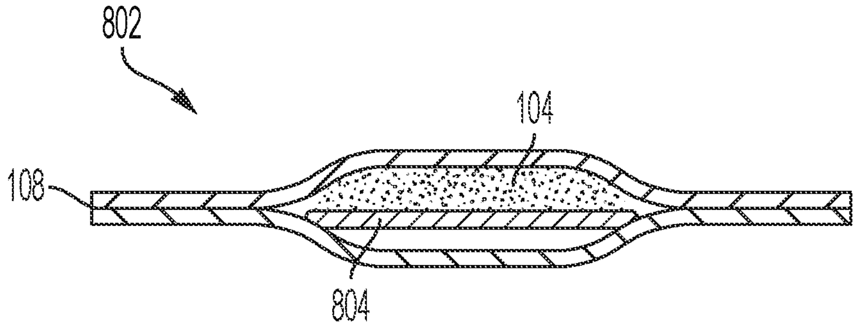

In various examples, the conductive gel 104 is printed, e.g., by being screen printed, onto the encapsulant 108 and the external conductor 216 is then placed, applied, or otherwise included into the external conductor 216. Additionally or alternatively, the conductive gel 104 and encapsulant 108 may be formed through a stencil-in-place process as disclosed in U.S. Pat. No. 11,088,063, STRUCTURES WITH DEFORMABLE CONDUCTORS, Ronay et al., which is incorporated herein in its entirety. The encapsulant 108 may then be processed to form the encapsulating seal as disclosed herein and as illustrated in FIG. 8B.

Figure 9:
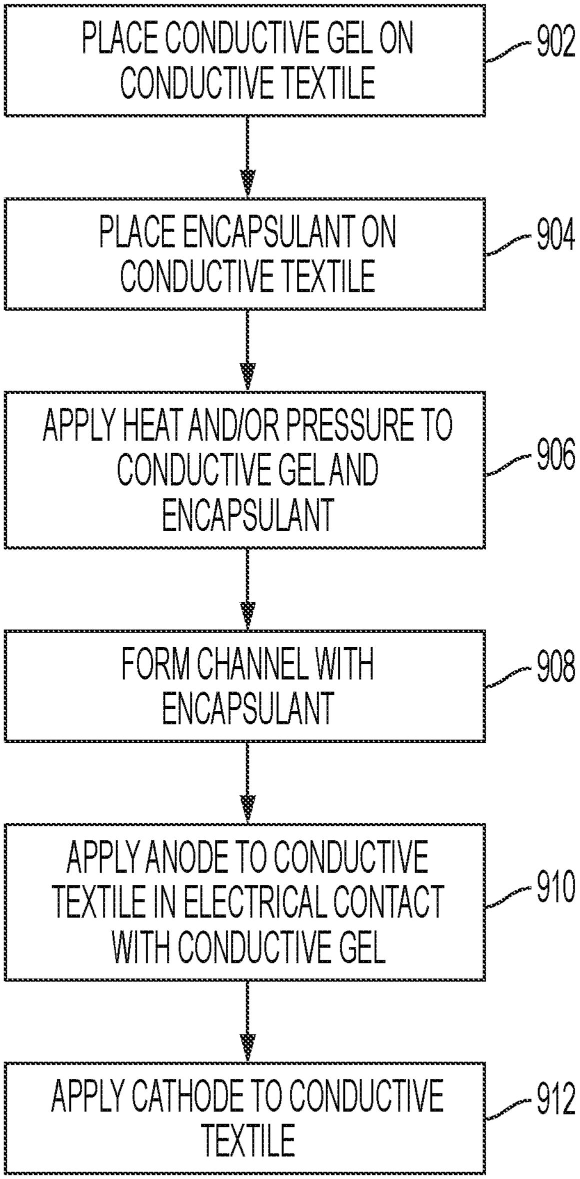
FIG. 9 is a flowchart for making a thermal blanket, in an example embodiment.

FIG. 9 is a flowchart for making a thermal blanket 402, in an example embodiment. While the flowchart is described with respect to the thermal blanket 402, it is to be recognized and understood that portions of the flowchart may be utilized to make the flexible bus 102 without respect to the thermal blanket 402. Moreover, while the various operations of the flowchart are described with respect to the components of the thermal blanket 402 and the flexible bus 102 as disclosed herein, it is to be recognized and understood that the operations are not limited only to such components and that the operations may be performed on or with any suitable components as recognized by one of ordinary skill in the art.

At 902, the conductive gel 104 is placed on the conductive textile 106 at a desired location. In an example, the conductive gel 104 is placed proximate a first edge 406 of the conductive textile 106.

At 904, the encapsulant 108 is placed on the conductive textile 106 proximate, on, or over the conductive gel 104.

At block 906, heat and/or pressure is applied with one or more heating elements 502 to cause the conductive gel 104 and encapsulant 108 to flow into voids in the conductive textile 106 and bring the conductive gel 104 into electrical contact with at least some of the conductive strands 206 of the conductive textile 106. The arrangement of the encapsulant 108 may constrain the conductive gel 104 and prevent the conductive gel 104 from flowing generally through the conductive textile 106.

At 908, applying heat and/or pressure at 906 optionally causes the encapsulant 108 to form a channel 204 in which the conductive gel 104 is contained.

At 910, an anode 404 is applied to the conductive textile 106 in electrical contact with and operably coupled to the conductive gel 104.

At 912, a cathode 408 is applied to the conductive textile 106 in electrical contact with and operably coupled to at least some of the conductive strands 206.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

The electrically conductive compositions, such as conductive gels, comprised in the articles described herein can, for example, have a paste like or gel consistency that can be created by taking advantage of, among other things, the structure that gallium oxide can impart on the compositions when gallium oxide is mixed into a eutectic gallium alloy. When mixed into a eutectic gallium alloy, gallium oxide can form micro or nano-structures that are further described herein, which structures are capable of altering the bulk material properties of the eutectic gallium alloy.

As used herein, the term "eutectic" generally refers to a mixture of two or more phases of a composition that has the lowest melting point, and where the phases simultaneously crystallize from molten solution at this temperature. The ratio of phases to obtain a eutectic is identified by the eutectic point on a phase diagram. One of the features of eutectic alloys is their sharp melting point.

The electrically conductive compositions can be characterized as conducting shear thinning gel compositions. The electrically conductive compositions described herein can also be characterized as compositions having the properties of a Bingham plastic. For example, the electrically conductive compositions can be viscoplastics, such that they are rigid and capable of forming and maintaining three-dimensional features characterized by height and width at low stresses but flow as viscous fluids at high stress. Thus, for example, the electrically conductive compositions can have a viscosity ranging from about 10,000,000 cP to about 40,000,000 cP under low shear and about 150 to 180 at high shear. For example under condition of low shear the composition has a viscosity of about 10,000,000 cP, about 15,000,000 cP, about 20,000,000 cP, about 25,000,000 cP, about 30,000,000 cP, about 45,000,000 cP, or about 40,000,000 cP under conditions of low shear. Under condition of high shear the composition has a viscosity of about 150 cP, about 155 cP, about 160 cP, 165 cP, about 170 cP, about 175 cP, or about 180 cP.

The electrically conductive compositions described herein can have any suitable conductivity, such as a conductivity of from about $2\times10^5$ S/m to about $8\times10^5$ S/m.

The electrically conductive compositions described herein can have any suitable melting point, such as a melting point of from about −20° C. to about 10° C., about −10° C. to about 5° C., about −5° C. to about 5° C. or about −5° C. to about 0° C.

The electrically conductive compositions can comprise a mixture of a eutectic gallium alloy and gallium oxide, wherein the mixture of eutectic gallium alloy and gallium oxide has a weight percentage (wt %) of between about 59.9% and about 99.9% eutectic gallium alloy, such as between about 67% and about 90%, and a wt % of between about 0.1% and about 2.0% gallium oxide such as between about 0.2 and about 1%. For example, the electrically conductive compositions can have about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or greater, such as about 99.9% eutectic gallium alloy, and about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, and about 2.0% gallium oxide.

The eutectic gallium alloy can include gallium-indium or gallium-indium-tin in any ratio of elements. For example, a eutectic gallium alloy includes gallium and indium. The electrically conductive compositions can have any suitable percentage of gallium by weight in the gallium-indium alloy that is between about 40% and about 95%, such as about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, or about 95%.

The electrically conductive compositions can have a percentage of indium by weight in the gallium-indium alloy that is between about 5% and about 60%, such as about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60%.

The eutectic gallium alloy can include gallium and tin. For example, the electrically conductive compositions can have a percentage of tin by weight in the alloy that is between about 0.001% and about 50%, such as about 0.001%, about 0.005%, about 0.01%, about 0.05%, about 0.1%, about 0.2%, about 0.3%, about 0.4%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, or about 50%.

The electrically conductive compositions can comprise one or more micro-particles or sub-micron scale particles blended with the eutectic gallium alloy and gallium oxide. The particles can be suspended, either coated in eutectic gallium alloy or gallium and encapsulated in gallium oxide or not coated in the previous manner, within eutectic gallium alloy. The micro- or sub-micron scale particles can range in size from nanometer to micrometer and can be suspended in gallium, gallium-indium alloy, or gallium-indium-tin alloy. Particle to alloy ratio can vary and can change the flow properties of the electrically conductive compositions. The micro and nano-structures can be blended within the electrically conductive compositions through sonication or other suitable means. The electrically conductive compositions can include a colloidal suspension of micro and nano-structures within the eutectic gallium alloy/gallium oxide mixture.

The electrically conductive compositions can further include one or more micro-particles or sub-micron scale particles dispersed within the compositions. This can be achieved in any suitable way, including by suspending particles, either coated in eutectic gallium alloy or gallium and encapsulated in gallium oxide or not coated in the previous manner, within the electrically conductive compositions or, specifically, within the eutectic gallium alloy fluid. These particles can range in size from nanometer to micrometer and can be suspended in gallium, gallium-indium alloy, or gallium-indium-tin alloy. Particle to alloy ratio can vary, in order to, among other things, change fluid properties of at least one of the alloy and the electrically conductive compositions. In addition, the addition of any ancillary material to colloidal suspension or eutectic gallium alloy in order to, among other things, enhance or modify its physical, electrical or thermal properties. The distribution of micro and nano-structures within the at least one of the eutectic gallium alloy and the electrically conductive compositions can be achieved through any suitable means, including sonication or other mechanical means without the addition of particles. In certain embodiments, the one or more micro-particles or sub-micron particles are blended with the at least one of the eutectic gallium alloy and the electrically conductive compositions with wt % of between about 0.001% and about 40.0% of micro-particles, for example about 0.001%, about 0.005%, about 0.01%, about 0.05%, about 0.1%, about 0.2%, about 0.3%, about 0.4%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, or about 40.

The one or more micro- or sub-micron particles can be made of any suitable material including soda glass, silica, borosilicate glass, quartz, oxidized copper, silver coated copper, non-oxidized copper, tungsten, super saturated tin granules, glass, graphite, silver coated copper, such as silver coated copper spheres, and silver coated copper flakes, copper flakes, or copper spheres, or a combination thereof, or any other material that can be wetted by the at least one of the eutectic gallium alloy and the electrically conductive compositions. The one or more micro-particles or sub-micron scale particles can have any suitable shape, including the shape of spheroids, rods, tubes, a flakes, plates, cubes, prismatic, pyramidal, cages, and dendrimers. The one or more micro-particles or sub-micron scale particles can have any suitable size, including a size range of about 0.5 microns to about 60 microns, as about 0.5 microns, about 0.6 microns, about 0.7 microns, about 0.8 microns, about 0.9 microns, about 1 microns, about 1.5 microns, about 2 microns, about 3 microns, about 4 microns, about 5 microns, about 6 microns, about 7 microns, about 8 microns, about 9 microns, about 10 microns, about 11 microns, about 12 microns, about 13 microns, about 14 microns, about 15 microns, about 16 microns, about 17 microns, about 18 microns, about 19 microns, about 20 microns, about 21 microns, about 22 microns, about 23 microns, about 24 microns, about 25 microns, about 26 microns, about 27 microns, about 28 microns, about 29 microns, about 30 microns, about 31 microns, about 32 microns, about 33 microns, about 34 microns, about 35 microns, about 36 microns, about 37 microns, about 38 microns, about 39 microns, about 40 microns, about 41 microns, about 42 microns, about 43 microns, about 44 microns, about 45 microns, about 46 microns, about 47 microns, about 48 microns, about 49 microns, about 50 microns, about 51 microns, about 52 microns, about 53 microns, about 54 microns, about 55 microns, about 56 microns, about 57 microns, about 58 microns, about 59 microns, or about 60 microns.

The electrically conductive compositions described herein can be made by any suitable method, including a method comprising blending surface oxides formed on a surface of a eutectic gallium alloy into the bulk of the eutectic gallium alloy by shear mixing of the surface oxide/alloy interface. Shear mixing of such compositions can induce a cross linked microstructure in the surface oxides; thereby forming a conducting shear thinning gel composition. A colloidal suspension of micro-structures can be formed within the eutectic gallium alloy/gallium oxide mixture, for example as, gallium oxide particles and/or sheets.

The surface oxides can be blended in any suitable ratio, such as at a ratio of between about 59.9% (by weight) and about 99.9% eutectic gallium alloy, to about 0.1% (by weight) and about 2.0% gallium oxide. For example percentage by weight of gallium alloy blended with gallium oxide is about 60%, 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or greater, such as about 99.9% eutectic gallium alloy while the weight percentage of gallium oxide is about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, and about 2.0% gallium oxide. In embodiments, the eutectic gallium alloy can include gallium-indium or gallium-indium-tin in any ratio of the recited elements. For example, a eutectic gallium alloy can include gallium and indium.

The weight percentage of gallium in the gallium-indium alloy can be between about 40% and about 95%, such as about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, or about 95%.

Alternatively or in addition, the weight percentage of indium in the gallium-indium alloy can be between about 5% and about 60%, such as about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60%.

A eutectic gallium alloy can include gallium, indium, and tin. The weight percentage of tin in the gallium-indium-tin alloy can be between about 0.001% and about 50%, such as about 0.001%, about 0.005%, about 0.01%, about 0.05%, about 0.1%, about 0.2%, about 0.3%, about 0.4%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, or about 50%.

The weight percentage of gallium in the gallium-indium-tin alloy can be between about 40% and about 95%, such as about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, or about 95%.

Alternatively or in addition, the weight percentage of indium in the gallium-indium-tin alloy can be between about 5% and about 60%, such as about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60%.

One or more micro-particles or sub-micron scale particles can be blended with the eutectic gallium alloy and gallium oxide. For example, the one or more micro-particles or sub-micron particles can be blended with the mixture with wt % of between about 0.001% and about 40.0% of micro-particles in the composition, for example about 0.001%, about 0.005%, about 0.01%, about 0.05%, about 0.1%, about 0.2%, about 0.3%, about 0.4%, about 0.5%, about 0.6%, about 0.7%, about 0.8%, about 0.9%, about 1%, about 1.5%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, or about 40. In embodiments the particles can be soda glass, silica, borosilicate glass, quartz, oxidized copper, silver coated copper, non-oxidized copper, tungsten, super saturated tin granules, glass, graphite, silver coated copper, such as silver coated copper spheres, and silver coated copper flakes, copper flakes or copper spheres or a combination thereof, or any other material that can be wetted by gallium. In some embodiments the one or more micro-particles or sub-micron scale particles are in the shape of spheroids, rods, tubes, a flakes, plates, cubes, prismatic, pyramidal, cages, and dendrimers. In certain embodiments, the one or more micro-particles or sub-micron scale particles are in the size range of about 0.5 microns to about 60 microns, as about 0.5 microns, about 0.6 microns, about 0.7 microns, about 0.8 microns, about 0.9 microns, about 1 microns, about 1.5 microns, about 2 microns, about 3 microns, about 4 microns, about 5 microns, about 6 microns, about 7 microns, about 8 microns, about 9 microns, about 10 microns, about 11 microns, about 12 microns, about 13 microns, about 14 microns, about 15 microns, about 16 microns, about 17 microns, about 18 microns, about 19 microns, about 20 microns, about 21 microns, about 22 microns, about 23 microns, about 24 microns, about 25 microns, about 26 microns, about 27 microns, about 28 microns, about 29 microns, about 30 microns, about 31 microns, about 32 microns, about 33 microns, about 34 microns, about 35 microns, about 36 microns, about 37 microns, about 38 microns, about 39 microns, about 40 microns, about 41 microns, about 42 microns, about 43 microns, about 44 microns, about 45 microns, about 46 microns, about 47 microns, about 48 microns, about 49 microns, about 50 microns, about 51 microns, about 52 microns, about 53 microns, about 54 microns, about 55 microns, about 56 microns, about 57 microns, about 58 microns, about 59 microns, or about 60 microns.

EXAMPLES

Example 1 is an apparatus, comprising: a conductive textile comprising a plurality of conductive strands; a flexible bus, comprising: a conductive gel electrically coupled to the conductive strands; and an encapsulant bonded to the conductive textile and configured to contain the conductive gel in contact with the conductive strands; wherein the flexible bus is configured to be electrically coupled to a power source and induce a current from the power source to the conductive strands.

In Example 2, the subject matter of Example 1 includes, wherein the conductive strands form a conductive layer of the conductive textile.

In Example 3, the subject matter of any one or more of Examples 1 or 2 includes, wherein the conductive textile further comprises a non-conductive layer comprised of non-conductive strands, the non-conductive layer positioned adjacent to the conductive layer.

In Example 4, the subject matter of any one or more of Examples 1-3 includes, wherein the flexible bus is positioned proximate a first edge of the conductive textile.

In Example 5, the subject matter of any one or more of Examples 1~4 includes, a cathode positioned proximate a second edge of the conductive textile opposite the first edge, wherein the cathode is configured to complete an electrical circuit to allow current to flow over the conductive layer.

In Example 6, the subject matter of any one or more of Examples 1-5 includes, a flexible board operatively coupled to the cathode, the flexible board comprising a first substrate layer, a second substrate layer, and a surface mount component, the first substrate layer comprising a metal clad layer, the second substrate layer including a trace formed of conductive gel, the surface mount component electrically coupled to the metal clad layer.

In Example 7, the subject matter of any one or more of Examples 1-6 includes, wherein the flexible bus further comprises an anode, electrically coupled to the conductive gel, wherein the power source is configured to be electrically coupled to the anode to allow current to flow from the power source to the conductive gel.

In Example 8, the subject matter of any one or more of Examples 1-7 includes, wherein the plurality of conductive strands extend between the first edge and the second edge.

In Example 9, the subject matter of any one or more of Examples 1-8 includes, wherein the plurality of non-conductive strands extend orthogonal to the conductive strands.

In Example 10, the subject matter of any one or more of Examples 1-9 includes, wherein the conductive layer is a first conductive layer and wherein the conductive textile further comprises a second conductive layer electrically coupled to the conductive gel, the non-conductive layer positioned between the first and second conductive layers, the non-conductive layer and the encapsulant providing electrical isolation between the first and second conductive layers.

Example 11 is an apparatus, comprising: a conductive textile comprising conductive strands and non-conductive strands; an encapsulant forming a channel extending at least in part into and enclosing a portion of the conductive textile; and a conductive gel, dispersed in the conductive textile within the channel and electrically coupled to at least some of the conductive strands.

In Example 12, the subject matter of Example 11 includes, wherein the conductive and non-conductive strands extend beyond the channel.

In Example 13, the subject matter of any one or more of Examples 11 and 12 includes, wherein the encapsulant forms at least two walls opposing one another, the channel having a width defined at least in part by the two opposing walls, wherein at least some of the conductive and non-conductive strands extend through and beyond at least one of the two walls.

In Example 14, the subject matter of any one or more of Examples 11-13 includes, wherein at least some of the conductive and non-conductive strands extend through and beyond both of the two walls.

In Example 15, the subject matter of any one or more of Examples 11-14 includes, an anode, electrically coupled to the conductive gel, wherein a power source is configured to be electrically coupled to the anode to allow current to flow from the power source to the conductive gel.

In Example 16, the subject matter of any one or more of Examples 11-15 includes, wherein the anode comprises an external conductor and an adhesive, the adhesive configured to secure the anode to the conductive textile.

In Example 17, the subject matter of any one or more of Examples 11-16 includes, wherein the external conductor is copper foil backed by the adhesive.

In Example 18, the subject matter of any one or more of Examples 11-17 includes, a cathode positioned on the conductive textile separate from the conductive gel, wherein the cathode is configured to complete an electrical circuit to allow current to flow over the conductive layer.

In Example 19, the subject matter of any one or more of Examples 11-18 includes, wherein the conductive strands are generally parallel with respect to one another and the non-conductive strands extend orthogonal to the conductive strands.

Example 20 is a flexible electronic bus, comprising: a conductive textile comprising a plurality of conductive strands; a conductive gel electrically coupled to the conductive strands; and an encapsulant bonded to the conductive textile and configured to contain the conductive gel in contact with the conductive strands; wherein the flexible bus is configured to be electrically coupled to a power source and induce a current from the power source to the conductive strands.

In Example 21, the subject matter of Example 20 includes, an anode, electrically coupled to the conductive gel, wherein the power source is configured to be electrically coupled to the anode to allow current to flow from the power source to the conductive gel.

In Example 22, the subject matter of any one or more of Examples 20 and 21 includes, wherein the encapsulant forms a channel containing at least in part the conductive gel, the channel defined by at least two walls opposing one another, the channel having a width defined at least in part by the two opposing walls.

Example 23 is a method, comprising: placing conductive gel on a conductive textile; placing an encapsulant on the conductive textile proximate the conductive gel; applying, with a heating element, at least one of heat and pressure to the conductive gel and to the encapsulant to electrically couple the conductive gel to conductive strands of the conductive textile and to constrain, at least in part, the conductive gel within the encapsulant.

In Example 24, the subject matter of Example 23 includes, wherein applying at least one of heat and pressure forms the encapsulant into a channel enclosing a portion of the conductive textile and the conductive gel.

In Example 25, the subject matter of any one or more of Examples 23 and 24 includes, wherein applying at least one of heat and pressure forms the encapsulant into at least two walls defining a width of the channel and wherein at least some of the conductive strands extend through and beyond at least one of the two walls.

In Example 26, the subject matter of any one or more of Examples 23-25 includes, wherein at least some of the conductive and non-conductive strands extend through and beyond both of the two walls.

Example 27 is a flexible bus, comprising: an encapsulant defining a channel; a first material having voids substantially filling the channel; and a conductive gel substantially filling the voids of the first material.

In Example 28, the subject matter of Example 27 includes, wherein the channel has a cross-sectional shape, and wherein the encapsulant defines an enclosed perimeter of the shape.

In Example 29, the subject matter of any one or more of Examples 27 and 28 includes, wherein the conductive gel and the first material substantially fill an area bounded by the enclosed perimeter.

In Example 30, the subject matter of any one or more of Examples 27-29 includes, a thin foil of metal within the channel.

In Example 31, the subject matter of any one or more of Examples 27-30 includes, wherein the channel has a cross-sectional shape, and wherein the encapsulant defines an enclosed perimeter of the shape.

In Example 32, the subject matter of any one or more of Examples 27-31 includes, wherein the conductive gel, the first material, and the metal foil substantially fill an area bounded by the enclosed perimeter.

In Example 33, the subject matter of Examples 30-32 includes, wherein the metal foil comprises copper.

In Example 34, the subject matter of any one or more of Examples 27-33 includes, wherein the first material is a textile.

In Example 35, the subject matter of any one or more of Examples 27-34 includes, wherein the first material is an open cell material.

Example 36 is at least one machine-readable medium including instructions that, when executed by processing circuitry, cause the processing circuitry to perform operations to implement of any of Examples 1-35.

Example 37 is an apparatus comprising means to implement of any of Examples 1-35.

Example 38 is a system to implement of any of Examples 1-35.

Example 39 is a method to implement of any of Examples 1-35.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an “algorithm” is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as “data,” “content,” “bits,” “values,” “elements,” “symbols,” “characters,” “terms,” “numbers,” “numerals,” or the like. These words, however, are merely convenient labels and are to be associated with appropriate physical quantities.

Unless specifically stated otherwise, discussions herein using words such as “processing,” “computing,” “calculating,” “determining,” “presenting,” “displaying,” or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms “a” or “an” are herein used, as is common in patent documents, to include one or more than one instance. Finally, as used herein, the conjunction "or" refers to a non-exclusive "or," unless specifically stated otherwise.

What is claimed is:

1. An apparatus, comprising:
a conductive textile comprising a plurality of conductive strands;
a flexible bus positioned proximate a first edge of the conductive textile, comprising:
an electrically conductive liquid or gel that is electrically coupled to the conductive strands; and
an encapsulant bonded to the conductive textile and configured to contain the electrically conductive liquid or gel in contact with the conductive strands;
a cathode positioned proximate a second edge of the conductive textile opposite the first edge;
wherein the flexible bus is configured to be electrically coupled to a power source and to conduct a current from the power source to the conductive strands and wherein the cathode is configured to complete an electrical circuit to allow current to flow over the conductive strands.

2. The apparatus of claim 1, wherein the conductive strands form a conductive layer of the conductive textile.

3. The apparatus of claim 2, wherein the conductive textile further comprises a non-conductive layer comprised of non-conductive strands, the non-conductive layer positioned adjacent to the conductive layer.

4. The apparatus of claim 3, wherein the conductive layer is a first conductive layer and wherein the conductive textile further comprises a second conductive layer electrically coupled to the conductive liquid or gel, the non-conductive layer positioned between the first and second conductive layers, the non-conductive layer and the encapsulant providing electrical isolation between the first and second conductive layers.

5. The apparatus of claim 1, further comprising a flexible board operatively coupled to the cathode, the flexible board comprising a first substrate layer, a second substrate layer, and a surface mount component, the first substrate layer comprising a metal clad layer, the second substrate layer including a trace formed of conductive gel, the surface mount component electrically coupled to the metal clad layer.

6. The apparatus of claim 1, wherein the flexible bus further comprises an anode, electrically coupled to the conductive liquid or gel, wherein the power source is configured to be electrically coupled to the anode to allow current to flow from the power source to the conductive liquid or gel.

7. The apparatus of claim 1, wherein the plurality of conductive strands extend between the first edge and the second edge.

8. The apparatus of claim 7, wherein the plurality of non-conductive strands extend orthogonal to the conductive strands.

9. An apparatus, comprising:
a conductive textile comprising conductive strands and non-conductive strands;
an encapsulant forming a channel extending at least in part into and enclosing a portion of the conductive textile;
an electrically conductive liquid or gel, dispersed in the conductive textile within the channel and electrically coupled to at least some of the conductive strands; and
an anode, electrically coupled to the conductive liquid or gel, wherein a power source is configured to be electrically coupled to the anode to allow current to flow from the power source to the conductive liquid or gel.

10. The apparatus of claim 9, wherein the conductive and non-conductive strands extend beyond the channel.

11. The apparatus of claim 10, wherein the encapsulant forms at least two walls opposing one another, the channel having a width defined at least in part by the two opposing walls, wherein at least some of the conductive and non-conductive strands extend through and beyond at least one of the two walls.

12. The apparatus of claim 11, wherein at least some of the conductive and non-conductive strands extend through and beyond both of the two walls.

13. The apparatus of claim 9, wherein the anode comprises an external conductor and an adhesive, the adhesive configured to secure the anode to the conductive textile.

14. The apparatus of claim 13, wherein the external conductor is copper foil backed by the adhesive.

15. The apparatus of claim 9, further comprising a cathode positioned on the conductive textile separate from the conductive liquid or gel, wherein the cathode is configured to complete an electrical circuit to allow current to flow over the conductive layer.

16. The apparatus of claim 9, wherein the conductive strands are parallel with respect to one another and the non-conductive strands extend orthogonal to the conductive strands.

17. A flexible electronic bus, comprising:
a conductive textile comprising a plurality of conductive strands;
a conductive liquid or gel that is electrically coupled to the conductive strands;
an encapsulant bonded to the conductive textile and configured to contain the conductive gel in contact with the conductive strands; and
an anode, electrically coupled to the conductive liquid or gel, wherein the power source is configured to be electrically coupled to the anode to allow current to flow from the power source to the conductive liquid or gel;
wherein the flexible bus is configured to be electrically coupled to a power source and to conduct a current from the power source to the conductive strands; and
wherein the encapsulant forms a channel containing at least in part the conductive liquid or gel, the channel defined by at least two walls opposing one another, the channel having a width defined at least in part by the two opposing walls.

* * * * *